(12) United States Patent
Thomson et al.

(10) Patent No.: US 8,055,411 B2
(45) Date of Patent: Nov. 8, 2011

(54) STEERING SYSTEM AND METHOD OF STEERING A MACHINE

(75) Inventors: Norval P. Thomson, Dunlap, IL (US); Steven A. Daniel, East Peoria, IL (US); John V. Mount, Washington, IL (US); Christopher E. Bright, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 419 days.

(21) Appl. No.: 12/262,323

(22) Filed: Oct. 31, 2008

(65) Prior Publication Data

US 2010/0114430 A1 May 6, 2010

(51) Int. Cl.
*B62D 6/00* (2006.01)
(52) U.S. Cl. .......................... 701/41; 180/411
(58) Field of Classification Search .............. 701/41, 701/50; 180/248, 326, 65.5, 242, 6.64, 65.6, 180/6.62, 197, 305, 243, 244, 235, 411
See application file for complete search history.

(56) References Cited

U.S. PATENT DOCUMENTS

| | | | |
|---|---|---|---|
| 3,351,147 A | 11/1967 | Williamson | |
| 3,770,072 A | 11/1973 | Cheney | |
| 4,549,610 A * | 10/1985 | van der Lely | 172/3 |
| 4,598,782 A * | 7/1986 | Ilon | 180/7.1 |
| 4,887,686 A * | 12/1989 | Takei et al. | 180/211 |
| 5,775,453 A | 7/1998 | Williams et al. | |
| 5,823,284 A | 10/1998 | Hoar et al. | |
| 6,109,384 A | 8/2000 | Bromley et al. | |
| 6,189,641 B1 | 2/2001 | Azuma | |
| 6,257,357 B1 * | 7/2001 | Teal et al. | 180/6.2 |
| 6,283,237 B1 | 9/2001 | Muller | |
| 6,408,972 B1 | 6/2002 | Rodgers et al. | |
| 6,571,160 B2 | 5/2003 | Akita | |
| 6,718,244 B2 * | 4/2004 | Lin et al. | 701/50 |
| 6,808,036 B2 | 10/2004 | Pellenc | |
| 6,854,539 B2 | 2/2005 | Lewis | |
| 6,857,494 B2 * | 2/2005 | Kobayashi et al. | 180/243 |
| 6,966,502 B2 * | 11/2005 | Wilt | 239/172 |
| 7,044,259 B2 | 5/2006 | Stoll et al. | |
| 7,059,442 B2 | 6/2006 | Wilks et al. | |
| 7,147,073 B2 * | 12/2006 | Mollhagen | 180/65.51 |
| 7,172,046 B2 | 2/2007 | Ho et al. | |
| 7,201,245 B2 | 4/2007 | Shrive et al. | |
| 7,290,633 B2 | 11/2007 | Kasten et al. | |
| 2006/0207822 A1 * | 9/2006 | Taylor | 180/326 |
| 2006/0254840 A1 * | 11/2006 | Strong | 180/190 |
| 2009/0038866 A1 * | 2/2009 | Abe et al. | 180/65.7 |
| 2010/0072733 A1 * | 3/2010 | Levi | 280/682 |

* cited by examiner

*Primary Examiner* — Thomas Black
*Assistant Examiner* — Marthe Marc-Coleman
(74) *Attorney, Agent, or Firm* — Leydig, Voit & Mayer

(57) ABSTRACT

A steering system for steering a machine having opposing first and second sides with first and second pairs of rotatably mounted rear wheels disposed along the respective sides and at least one rotatably mounted, spaced front wheel. The system includes at least one first drive unit and at least one second drive unit for rotating the rear wheels of the respective pairs, and a steering input device that provides a signal to a controller that produces drive unit request signals to control the drive units to rotate the associated rear wheels along one side at rotational speeds greater than those along the other side to facilitate turning.

15 Claims, 7 Drawing Sheets

STEERING SYSTEM AND METHOD OF STEERING A MACHINE

TECHNICAL FIELD

This patent disclosure relates generally to a method and steering system for a machine, and, more particularly, to a method and system for steering a machine based upon speed ratios of the ground engaging devices.

BACKGROUND

Various systems have been developed to steer machines. Traditional arrangements turn a front or rear wheel or pair of wheels to steer the machine while the remaining wheels follow. Another arrangement is utilized in so called "skid steering" in which the wheels on one side of the machine are driven at a different rate of speed or direction than the wheels on the other side.

Articulated machines include a front frame member, a rear frame member, and an articulation joint connecting the front and rear frame members. Typically, to steer an articulated machine, the front frame member must be rotated relative to the longitudinal axis of the rear frame member about the articulation joint while the machine is being propelled. To rotate the front frame member, these machines commonly include articulation cylinders mounted between the frame members. The articulation cylinders are operated in opposite directions so that when one cylinder is extended forward, the other cylinder is retracted rearward and vice versa causing the front of the machine to face the intended turn. U.S. Pat. No. 6,283,237 to Muller presented an alternative steering arrangement wherein rotation of the wheels on one side of the machine is at a speed greater than the wheels on the other side of the machine. The difference in the speeds causes the machine to articulate and steer the machine in a desired direction.

Machines having a broad wheel base with two pairs of rear wheels and a spaced pair of front wheels, as in a motor grader, present additional steering and operational challenges, whether the machine is articulated or not. For example, it can be difficult to make tight corners in a machine that has such a broad wheelbase. Traction may be lost on one or more of the wheels, resulting in wheel slip. When steering the front wheels in a desired turn direction, they may lean and/or skid, causing not only excessive, and/or uneven wear on the tires, but failure to execute a desired turn. Moreover, it may be difficult to maintain a relatively constant load on an associated tool, such as a blade, which is commonly utilized with a motor grader.

Accordingly, it is desirable to provide an improved steering system for machines such as a motor grader that includes two pairs of rear wheels, and a spaced pair of front wheels. The present disclosure is directed to overcoming one or more of the problems as set forth above.

SUMMARY

The disclosure is directed to a steering system for steering a machine on a terrain. The machine includes a front and a rear, and opposing first and second sides. The steering system comprises first and second pairs of rotatably mounted rear wheels disposed along the first and second sides of the machine, respectively, and at least one rotatably mounted front wheel that is spaced from said first and second pairs of rear wheels. The system further includes a plurality of drive units including at least one first drive unit and at least one second drive unit for rotating the rear wheels of the first and second pairs, respectively. The system further includes a steering input device that produces a steering input signal that is provided to a controller that produces drive unit request signals to control the first and second drive units to rotate the associated rear wheels. The request signals cause the first drive unit to rotate the first pair of rear wheels disposed along the first side of the machine at rotational speeds that are greater than rotational speeds at which the second drive unit rotates the second pair of wheels disposed along the second side of the machine.

The disclosure also is directed to a machine for use on a terrain, the machine comprising front and rear frame portions, and first and second opposed sides. First and second pairs of rear wheels are rotatably coupled to the rear frame portion along the first and second sides, respectively, and at least one, spaced front wheel is rotatably coupled to the front frame portion. The machine further includes a plurality of drive units including at least a first drive unit disposed to rotate the rear wheels of the first pair, and at least a second drive unit disposed to rotate the rear wheels of the second pair. The machine further includes a steering input device that produces a steering input signal provided to a controller that produces drive unit request signals to control the first and second drive units to rotate the associated rear wheels. The request signals cause the first pair of rear wheels disposed along first side of the machine to rotate at rotational speeds greater than the rotational speeds of the second pair of rear wheels disposed along the second side of the machine.

The disclosure also relates to a method of steering a machine having front and rear frame portions, and first and second opposed sides on a terrain. First and second pairs of rear wheels are rotatably coupled to the rear frame portion along the first and second sides, respectively, and at least one front wheel is rotatably coupled to the front frame section. The machine also includes a plurality of drive units including at least a first drive unit disposed to rotate the rear wheels of the first pair, and at least a second drive unit disposed to rotate the rear wheels of the second pair. The method comprises the steps of producing a steering input signal, receiving the steering input signal, producing drive unit request signals in response to the steering input signal to control the first, second, third, and fourth drive units to rotate the associated rear wheels, and rotating the pair of wheels disposed along the first side of the machine at rotational speeds greater than the rotational speeds of the pair of wheels disposed along the second side of the machine.

BRIEF DESCRIPTION OF THE DRAWING(S)

DETAILED DESCRIPTION

Figure 1:
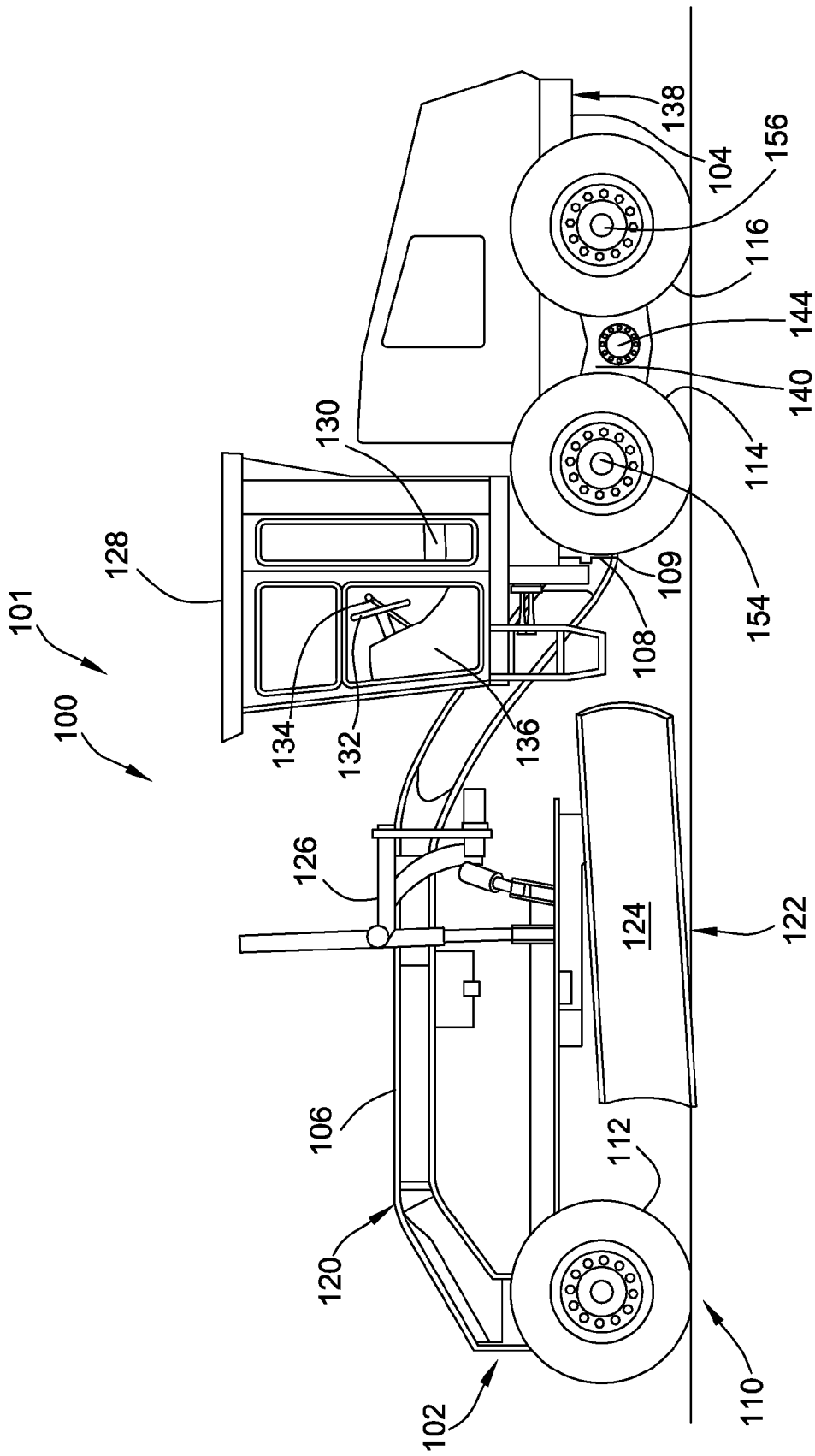
FIG. 1 is a side elevational view of a machine incorporating a control arrangement of this disclosure.

Turning now to the drawings, an exemplary embodiment of a machine 100 in the form of a motor grader 101 is illustrated in FIG. 1. It will be appreciated that, although a motor grader 101 is illustrated in FIG. 1, the term "machine" may refer to any machine that performs some type of operation associated with an industry such as mining, construction, farming, transportation, or any other industry known in the art. For example, a machine 100 may be an transport machine, such as truck or the like.

The motor grader 101 includes a mainframe 102 having a rear frame portion 104 and a front frame portion 106. The rear and front frame portions 104, 106 may optionally be articulated at an articulated joint 108, which includes a hinge 109. The mainframe 102 is supported on a plurality of ground engaging members 110. In the illustrated embodiment, the ground engaging members 110 include a pair of front wheels 111, 112, which are spaced from a plurality of rear wheels 113, 114, 115, 116, which are disposed pairs along opposite sides of the rear frame portion 104. It will be appreciated, however, that the ground engaging members 110 may include alternate arrangements, such as, for example, the rear wheels 113, 114, 115, 116 may alternately be track assemblies, as are known in the art.

The front frame portion 106 includes a front frame section 120 supported between the hinge 109 and forward ground engaging members 110, here, the illustrated pair of front wheels 111, 112. A blade assembly 122 is mounted along the front frame section 120 and may be utilized for grading. The blade assembly 122 includes a blade 124 and a linkage assembly 126 that allows the blade 124 to be moved to a variety of different positions relative to the motor grader 101. Although an exemplary blade 124 is illustrated as the attached implement, an alternate implement may be included, and employed for a variety of tasks and include, for example, plows, scarifiers, and rippers.

Returning to the illustrated embodiment, an operator cab 128 may be supported along the front frame section 120. The cab 128 may include, for example, a seat 130, a steering mechanism 132, a speed-throttle or control lever 134, and a console 136. An operator occupying the cab 128 can control the various functions and motion of the motor grader 101, for example, by using the steering mechanism 132 to set a direction of travel for the motor grader 101 or by using the control lever 134 to set the travel speed of the machine. As can be appreciated, the representations of the various control mechanisms presented herein are generic and are meant to encompass all possible mechanisms or devices used to convey an operator's commands to a machine, including, for example, so-called joystick operation. While an operator cab 128 is shown in the illustrated embodiments, the inclusion of such a cab and associated seat, control mechanisms and console are optional in that the machine could alternately be autonomous, that is, the machine may be controlled by a control system that does not require operation by an on-board human operator.

The rear frame portion 104 includes a rear frame section 138 that is supported on the plurality of ground engaging members 110 along either side of the machine 100. In the illustrated embodiment, the ground engaging members 110 supporting the rear frame section 138 include two pairs of rear wheels 113, 115 and 114, 116. Although the ground engaging members 110 may alternately be coupled directly to the rear frame portion 104, in the illustrated embodiment, the pairs of rear wheels 113, 115, 114, 116 are rotatably mounted on tandem supports 140, 142 that are themselves pivotably mounted along either side of the rear frame section 138 at pivot shafts 144, 146. Thus, each of the rear wheels 113, 114, 115, 116 rotates and the tandem supports 140, 142 pivot about respective axes. It will be understood by those of skill in the art that the ground engaging members 110 may include alternate or additional structure, such as, for example, belts (not shown) disposed about the pairs of rear wheels 113, 115, 114, 116.

To assist in steering the machine 100, the pairs of wheels 113, 114, 115, 116 along either side of the machine 100 may be separately controlled, such that the pairs of wheels 113, 114, 115, 116 along one side or the other of the machine 100 may be rotated at different speeds by drive units (as will be explained in greater detail below) to facilitate steering of the machine 100 along a desired path. For example, the wheels 114, 116 along one side may be rotated more rapidly than the wheels 113, 115 along the opposite side of the machine 100 in order to assist in turning the machine 100 or maintaining the machine 100 along a desired path.

The machine 100 may be hydrostatically motivated by a hydraulic system 148, as in the illustrated embodiment. As may be seen in the simplified schematic of FIG. 2, each of the rear wheels 113, 114, 115, 116 is mounted by a respective planetary hub 153, 154, 155, 156 to a respective drive unit, here, each respective hydraulic motors 163, 164, 165, 166 incident the tandem supports 140, 142. The hydraulic motors 163, 164, 165, 166 may be fixed or variable displacement. In order to drive the hydraulic motors 163, 164, 165, 166, at least two hydraulic pumps 168, 170 are provided. The first pump 168 is coupled to the hydraulic motors 163, 165 and, therefore, the rear wheels 113, 115 along one side of the machine 100 by conduits 171, 172, 173, 174, 175, 176, and the second pump 170 is coupled to the hydraulic motors 164, 166 and, therefore, the rear wheels 114, 116 along the other side of the machine 100 by conduits 181, 182, 183, 184, 185, 186. A prime mover, in this case, an engine 188, is coupled to the hydraulic pumps 168, 170 to drive or power the hydraulic system 148.

Figure 3:
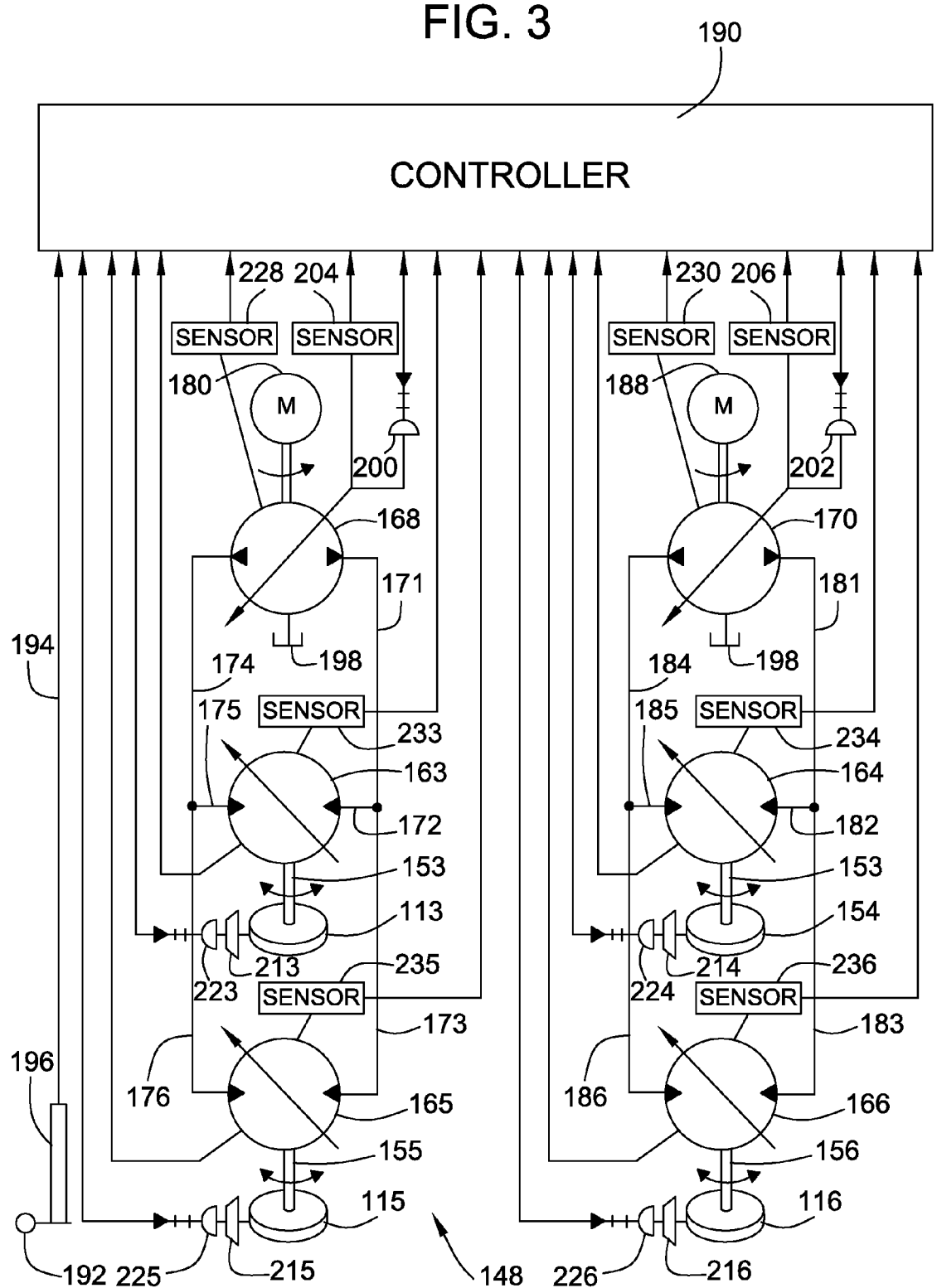
FIG. 3 is a schematic diagram of the hydraulic system of FIG. 2, incorporating the control arrangement.

A simplified circuit diagram of the hydraulic system 148 including electrical controls is shown in FIG. 3. The system 130, shown simplified for purposes of illustration, includes a portion of the drive circuit for driving the planetary hubs 153, 154, 155, 156, and, accordingly, the rear wheels 113, 114, 115, 116 coupled thereto. As can be appreciated, hydraulic components and connections to drive additional or optional components, such as the blade assembly 122, are not shown for the sake of simplicity. Additional hydraulic components and connections may be provided in alternate hydrostatically driven machines to perform operations such as, by way of example only, lifting and/or tilting of attached implements, such as a ripper (not shown).

An electronic controller 190 is connected to the machine 100 and arranged to receive information from various sensors on the machine 100, process that information, and issue commands to various components within the system during operation. Connections pertinent to the present description are shown but, as can be appreciated, a great number of other connections may be present relative to the controller 190. In this embodiment, the controller 190 is connected to a control input 192 (such as the steering mechanism 132) via a control signal line 194. The control input 192, shown schematically, may be, for example, a steering wheel or a lever moveable by the operator of the machine used to set a desired directional setting for the machine, and may generate any appropriate instruction to be provided to the controller 190. The position of the control input 192 may be translated to a control signal through a sensor 196 associated with the control input 192. The control signal relayed to the controller 190 may be used in a calculation, along with other parameters, for example, the speed of the engine 110, the ground speed of the machine 100, the temperature of fluid within a reservoir 198, additional sensors, as will be explained below, and so forth, to yield a desired operation of the machine 100.

Turning to the general operation of the hydraulic system 148 as illustrated in the circuit diagram of FIG. 3, the controller 190 provides directional instructions to the pumps 168, 170. The pumps 168, 170 are bidirectional, variable displacement pumps 168, 170, which are operated by a prime mover, in this case, the engine 188 of the machine 100. Hydraulic fluid is discharged from and supplied to the hydraulic pumps 168, 170 from a vented reservoir or drain 198. The pumps 168, 170 may be operated in any appropriate manner. In the disclosed arrangement, the control input 192 may be connected to servo control valves (not shown), which are arranged to change the angle of swashplates (not shown) internal to the pumps 168, 170 in response to movement of the control input 192. Motion of the swashplates is accomplished by actuators 200, 202 connected to the controller 190. The angle of the swashplates of the pumps 168, 170, may be sensed or measured with a sensors 204, 206. The sensors 204, 206 may be, for example, analog or digital sensors measuring the angle (or, equivalently, the displacement) of the swashplates within the pumps 168, 170.

Figure 2:
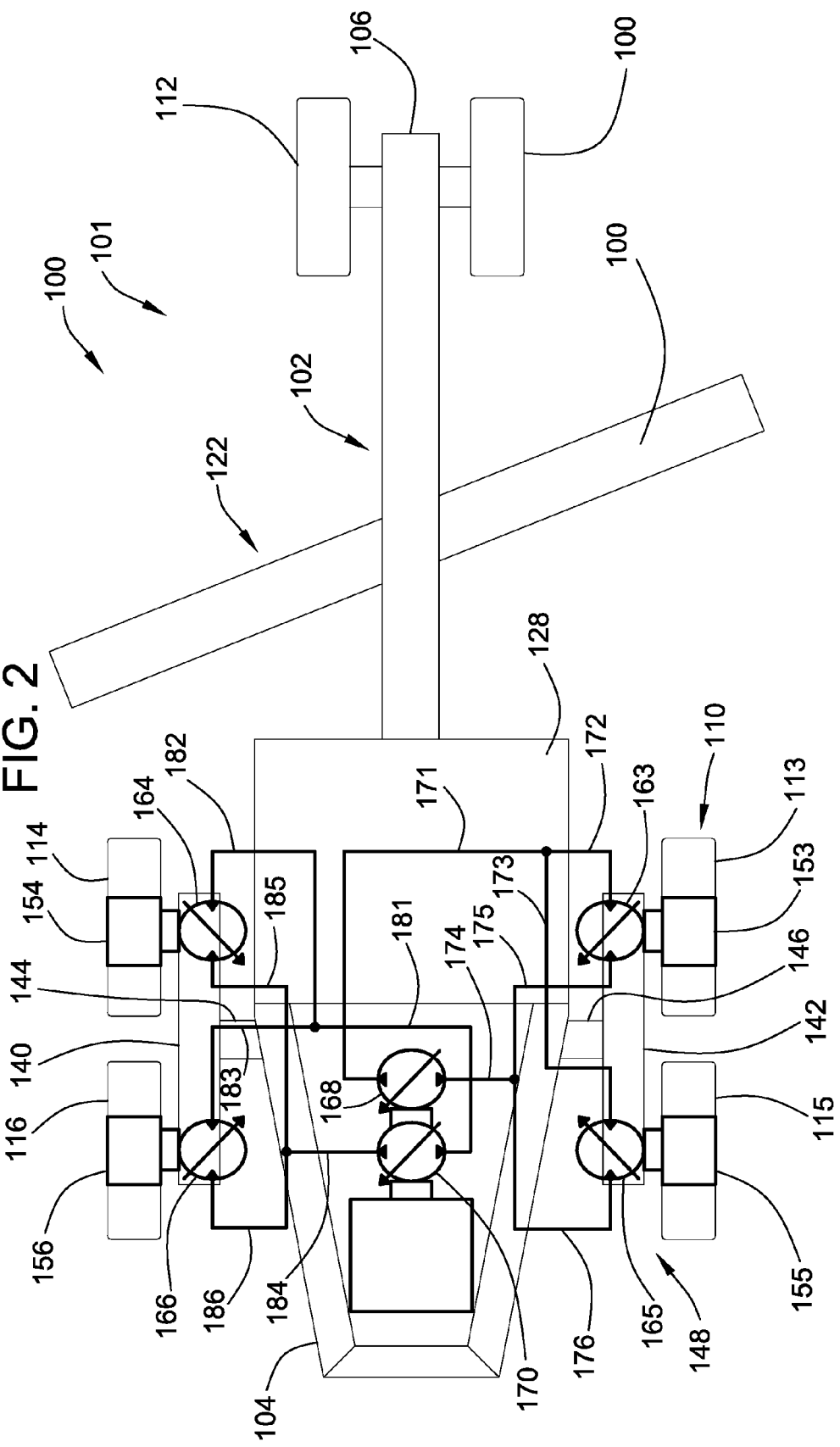
FIG. 2 is a schematic plan view of the machine of FIG. 1 incorporating the control arrangement.

In the embodiment illustrated in FIGS. 2 and 3, dual paths are provided from the pumps 168, 170 to the respective hydraulic motors 163, 165 and 164, 166, which are in turn coupled and arranged to rotate respective associated pairs of rear wheels 113, 115 and 114, 116. More specifically, depending on the indicated directions of the first hydraulic pump 168, the flow of fluid from the first pump 168 is routed into one of two conduits, a first conduit 171 and a second conduit 174, which are respectively connected to either side of the hydraulic motors 163, 165 by conduits 172, 175 and 173, 176, respectively. Similarly, depending upon the indicated directions, flow of fluid from the second hydraulic pump 170 is routed into one of two conduits 181, 184, which are coupled to one side of the hydraulic motors 164, 166 by conduits 182, 183, respectively, and to the opposite side of the hydraulic motors 164, 166 by conduits 185, 186, respectively. In this way, when the engine 188 is running and appropriate controls are applied to operate the hydraulic pumps 168, 170, the associated wheels 113, 114, 115, 116 are rotated in order to propel the machine 100 in the desired direction.

Brakes 213, 214, 215, 216, shown schematically, are arranged to arrest or stall motion of the wheels 113, 114, 115, 116, respectively, when actuated by actuators 223, 224, 225, 226, respectively. The brake actuators 223, 224, 225, 226 shown in this embodiment are electronic and actuate the brakes 213, 214, 215, 216 causing friction to arrest motion of the drum 114, but other configurations may be used. While the brakes 213, 214, 215, 216 are shown external to the wheels 113, 114, 115, 116 for illustration, more conventional designs such as those having the brakes 213, 214, 215, 216 protected within the wheels 113, 114, 115, 116 may be utilized.

Information regarding the operation of the hydraulic pumps 168, 170 and/or the hydraulic motors 163, 164, 165, 166, and/or the speed of the wheels 113, 114, 115, 116 may be provided to the controller 190 by any appropriate source. For example, any number of appropriate sensors may be provided at any number of locations. To provide information regarding the displacement of the pumps 168, 170, mechanical or electrical displacement sensors 228, 230 may be provided. Similarly, to provide information regarding the operation of the hydraulic motors 163, 164, 165, 166 mechanical or electrical displacement or speed sensors 233, 234, 235, 236 may be provided. In another embodiment, the wheels 113, 114, 115, 116 or planetary hubs 153, 154, 155, 156 may be provided with speed sensors (not shown). The number and placement of the sensors 228, 230, 233, 234, 235, 236 shown in FIG. 3 are provided by way of example only and are not meant to be limiting.

When the operator commands motion of the machine via the control input 192, a control signal is relayed to the controller 190 via the command input line 194. The controller 190 identifies the desired speeds of the pair of wheels 113, 115, and 114, 116 based upon various input received by the controller 190, including one or more of the following, for example, the displacement of the hydraulic pumps 168, 170, the displacement or speed of the hydraulic motors 163, 164, 165, 166, the speed of the wheels 113, 114, 115, 116 or planetary hubs 153, 154, 155, 156, the speed of the front wheels 111, 112, the steering angle of the front wheels 111, 112, the side load on the front wheels 111, 112, the articulation of rear and front frame portions 104, 106, if applicable, the heading provided by the control input 192, be it straight or a turn, the degree of wheel 111, 112, 113, 114, 115, 116 lean, and/or any other appropriate input. It will be appreciated that additional input may be provided to the controller 190 from any or all of these sources, or any other desired source, by any appropriate mechanical or electrical sensor or other direct or indirect reading. The controller 190 then provides signals to the pump actuators 200, 202 to provide desired settings for the swashplates of the pumps 168, 170, causing an appropriate flow of motive fluid through the respective hydraulic motors 163, 165 and 164, 166, which results in the desired rotation of the respective wheels 113, 115 and 114, 116.

To assist in steering the machine 100, the controller 190 identifies the desired speed ratio for the pairs of wheels 113, 115 and 114, 116 along either side of the machine 100, and provides a signal that sets the associated pumps 168, 170 to provide the desired speed ratio from one side of the machine 100 to the other. For example, should a left hand turn be indicated, the controller 190 may set the pumps 168, 170 to provide respective displacements such that the pump 170 causes the hydraulic motors 163, 165 to rotate the associated wheels 113, 115 along the right hand side of the machine 100 at a respectively greater speed than the pump 168 cause the hydraulic motor 164, 166 to rotate the associated wheels 114, 116 along the left hand side of the machine 100, or vice versa to assist in a right hand turn. By way of further example, if the machine 100 is set to travel in a straight line along the side of an inclined path, the pumps 168, 170 may be set such that that the pair of rear wheels disposed downhill are rotated at a greater speed than the pair of wheels disposed uphill in order to facilitate a straight line travel of the machine 100 along the side of the hill.

While the arrangement has been illustrated in FIGS. 2 and 3 as including a first pump 168 that is coupled to two hydraulic motors 163, 165 to rotate respective wheels 113, 115 along the right hand side of the machine 100, and a second pump 170 that is coupled to two hydraulic motors 164, 166 to rotate respective wheels 114, 116 along the left hand side of the machine 100, alternate arrangements may be provided. In describing examples of various arrangements that may be utilized to obtain such speed assist steering control, the same numbers will be utilized for the same or similar components.

Figure 4:
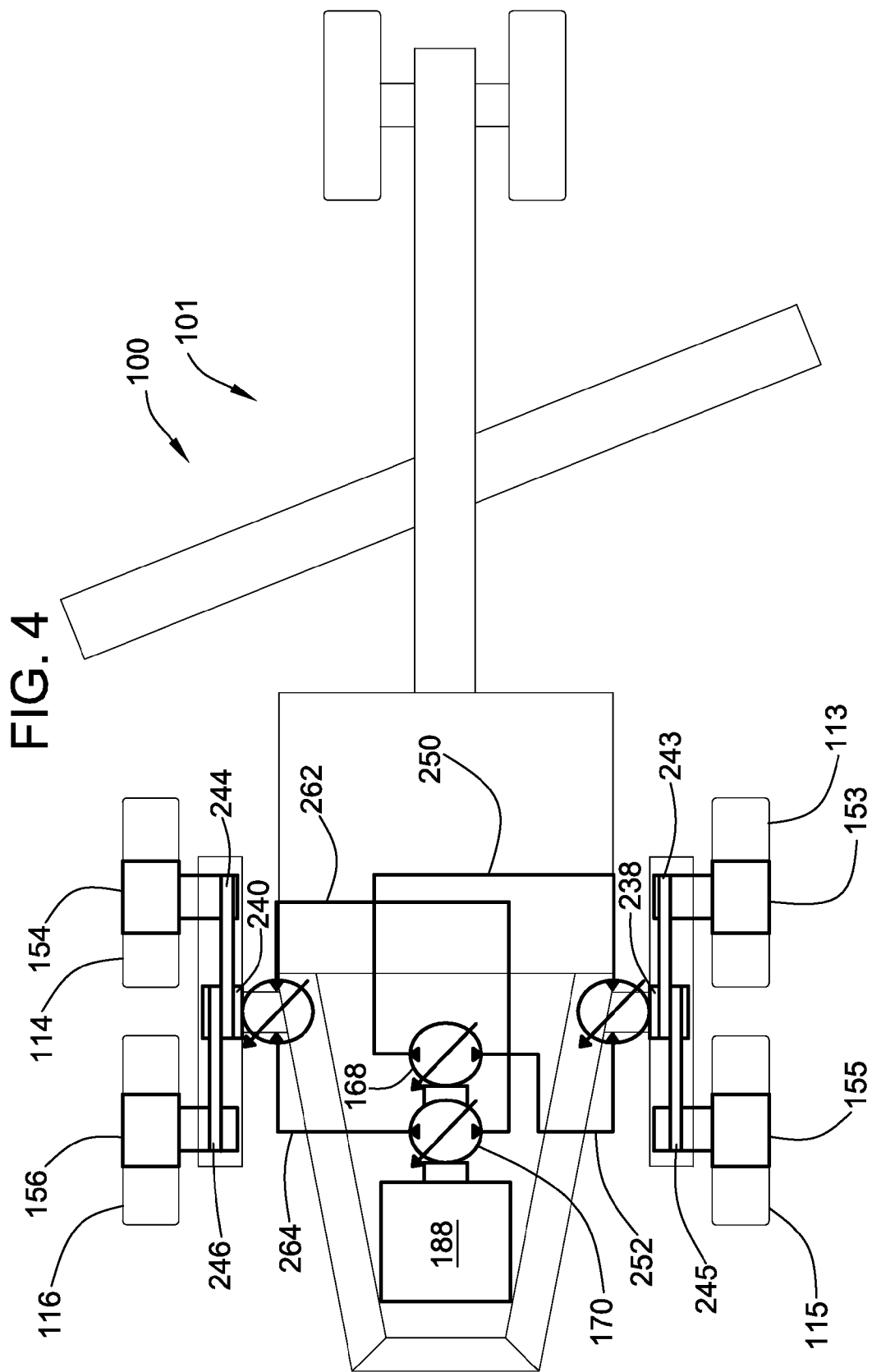
FIG. 4 is a schematic plan view of the machine of FIG. 1 incorporating an alternate embodiment of the control arrangement.
Figure 5:
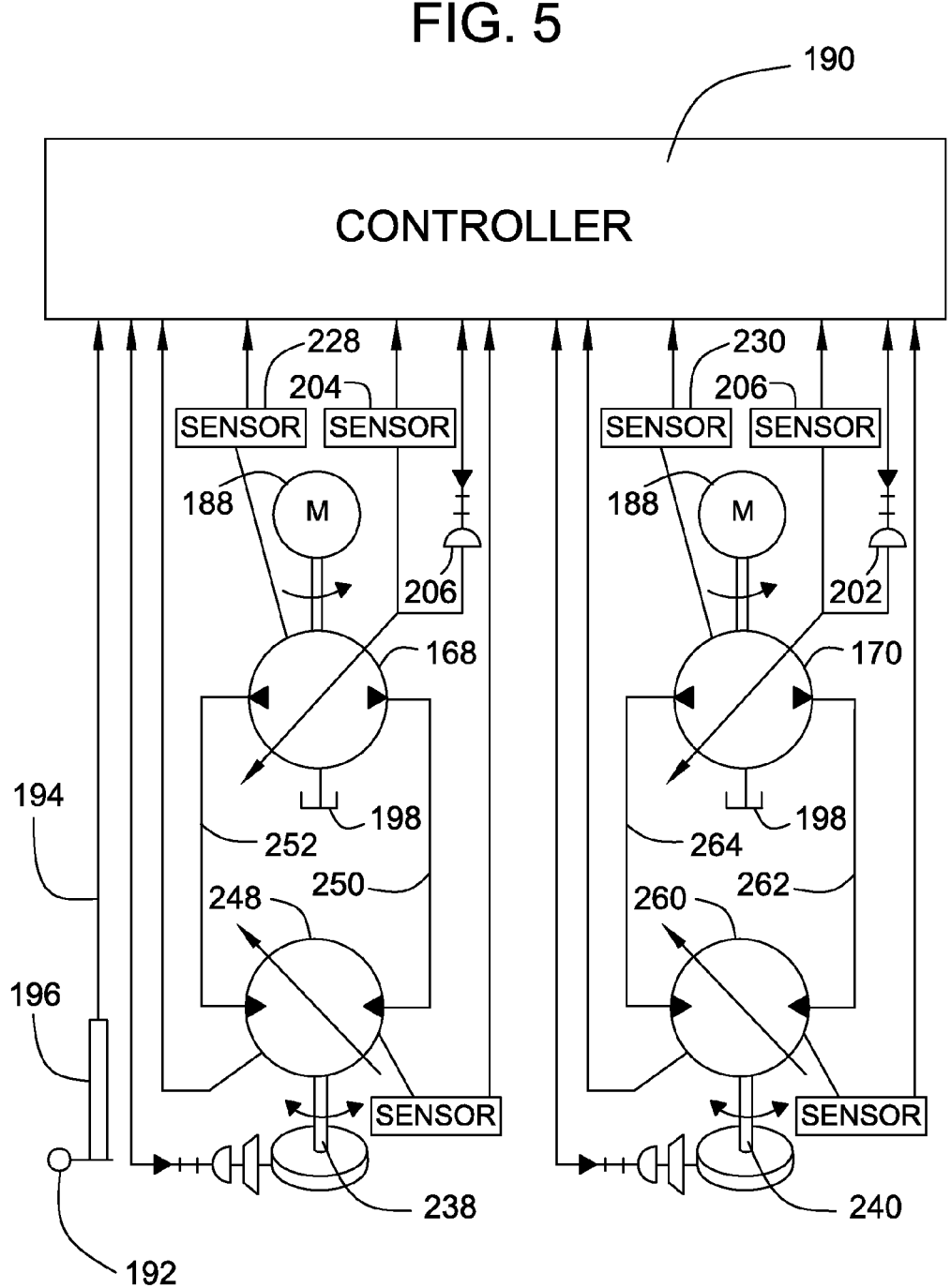
FIG. 5 is a schematic diagram of the hydraulic system of FIG. 4, incorporating the control arrangement.

While the embodiment of FIGS. 2 and 3 includes two pumps 168, 170, each fluidly coupled to a pair of hydraulic motors 163, 165 and 164, 166 coupled to a pair of wheels 113, 115 and 114, 116, respectively, along either side of the vehicle 100, alternate numbers of pumps and motors may be provided and arranged as desired to accomplish the disclosed speed ratio steering. For example, as shown in FIGS. 4 and 5, a motor grader 101 may include tandem wheel arrangements wherein the pairs of wheels 113, 115 and 114, 116 along either side of the machine 100 may be driven from respective, single rotary shafts 238, 240. The rotary motion of the shafts 238, 240 may be imparted to the hubs 153, 155 and 154, 156 of the wheels 113, 115 and 114, 116 by an appropriate rotation transmission arrangement, such as a gearing arrangement (not shown), respective belt or chain drives 243, 245 and 244, 246, such as those illustrated, or the like. Shaft 238 is rotated by a first hydraulic motor 248 fluidly coupled to the first hydraulic pump 168 by conduits 250, 252, while shaft 240 is rotated by a second hydraulic motor 260 coupled to the second hydraulic pump 170 by conduits 262, 264. In this way, the speed ratios of the pairs of wheels 113, 115 and 114, 116 on either side of the motor grader 101 may be controlled by the first and second hydraulic motors 248, 260 coupled to the first and second hydraulic pumps 168, 170, respectively, to facilitate steering control of the motor grader. In an alternate embodiment, the first and second hydraulic motors may be respectively coupled directly to one wheel in each of the pairs of wheels and then coupled to the other of the wheels by an appropriate rotation transmission arrangement.

Figure 6:
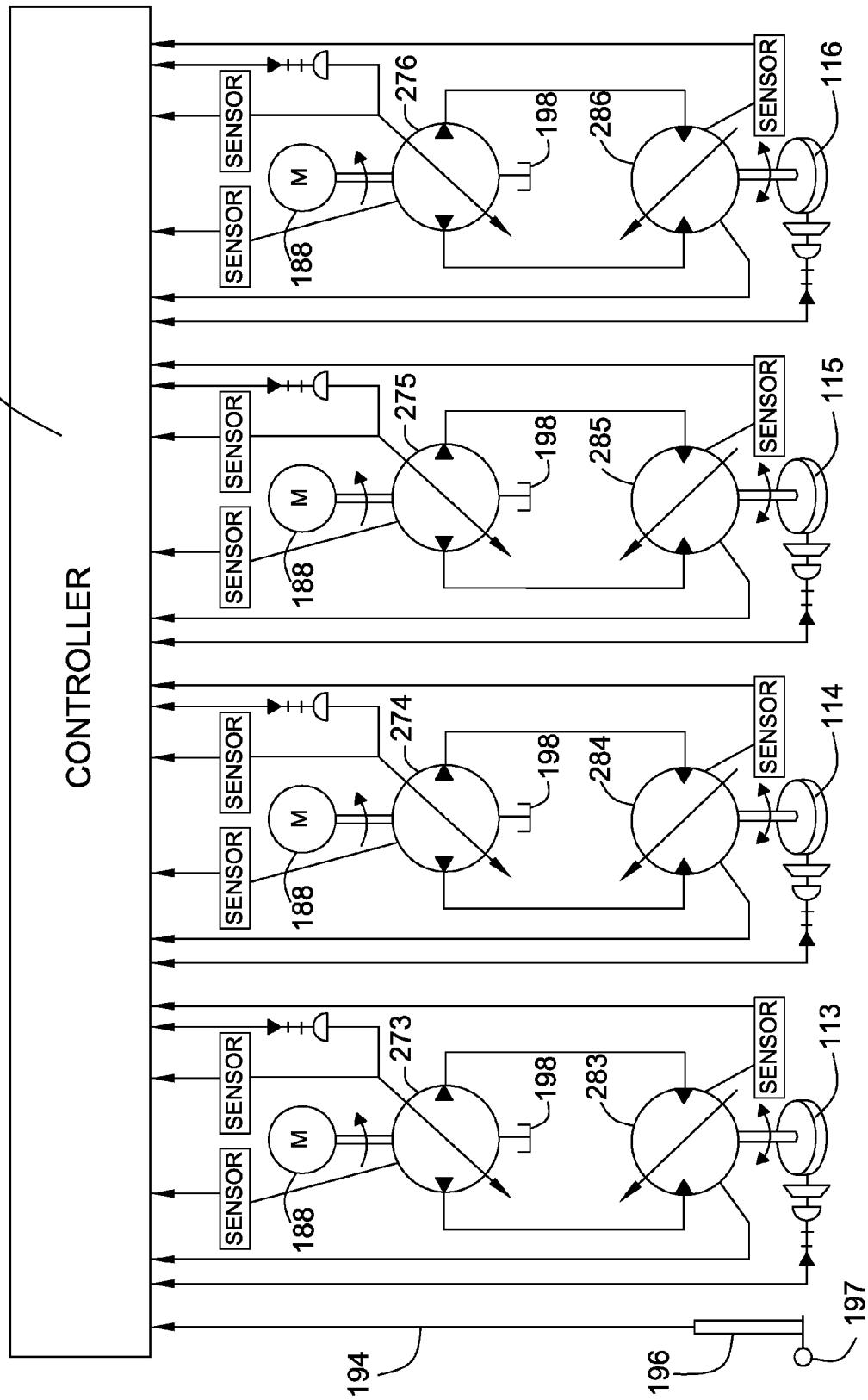
FIG. 6 is a schematic diagram of another alternate embodiment of a hydraulic system incorporating the control arrangement.
Figure 7:
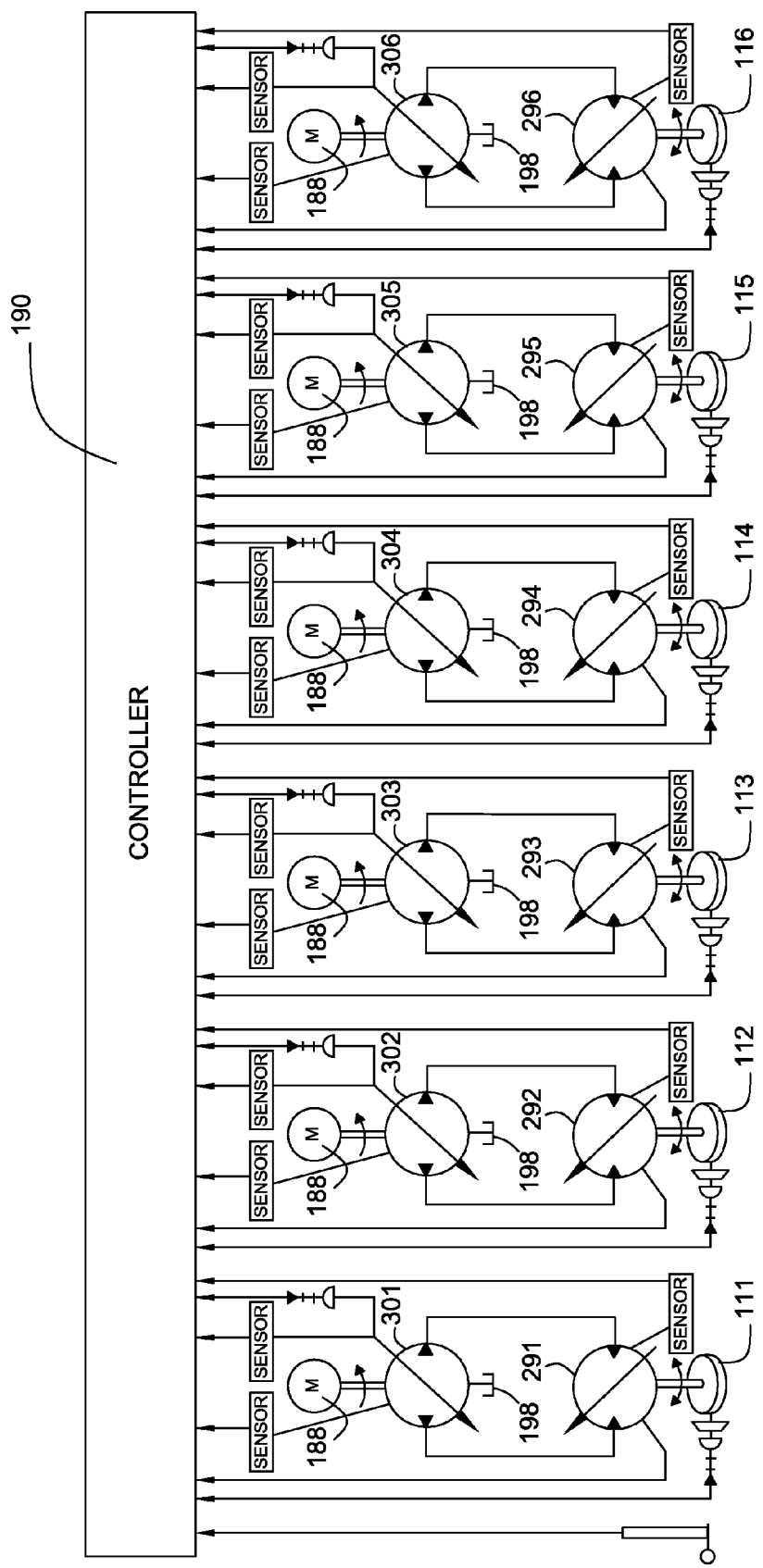
FIG. 7 is a schematic diagram of yet another alternate embodiment of a hydraulic system incorporating the control arrangement.

In yet another embodiment illustrated in the schematic of FIG. 6, a separate pump 273, 274, 275, 276 may be fluidly coupled to respective hydraulic motors 283, 284, 285, 286 coupled to the respective wheels 113, 114, 115, 116. In further embodiments, such as the embodiment of FIG. 7, each of the wheels 111, 112, 113, 114, 115, 116 may be separately driven by a respective hydraulic motor 291, 292, 293, 294, 295, 296 fluidly coupled to a respective hydraulic pump 301, 302, 303, 304, 305, 306. In yet another embodiment (not illustrated), the embodiment of FIGS. 4 and 5 may additionally be provided with a third pump and a third hydraulic motor that drives the front wheels 111, 112 of the machine 100.

INDUSTRIAL APPLICABILITY

The present disclosure is applicable to a machine 100 having a mainframe 102 supported on a plurality of ground engaging members 110 including at least on front wheel 111, 112 and two pairs of rear wheels 113, 115, 114, 116 wherein the rear wheels along one side of the machine 100 may be rotated at a different speed than the rear wheels along the other side of the machine 100. The mainframe 102 may be articulated between a front frame section 120 to which the front wheel(s) 111, 112 are rotatably coupled, and a rear frame section 138 to which the rear wheels 113, 114, 115, 116 are rotatably coupled.

This rotation of the wheels 113, 115, 114, 116 along either side at different speeds may assist in steering the machine 100 in turns. Additionally, it may facilitate steering the machine 100 through turns or along a substantially straight line when traversing a hill or other incline. The disclosed arrangements may be particularly useful when attempting to turn upward into an incline.

This disclosed arrangements may result in the ability for the machine 100 to turn along a tighter radius. In situations wherein a load is exerted on the blade 124, the disclosed arrangements may permit the application of a fully tractive load when turning a corner.

The disclosed arrangements may additionally result in reduced wear of the machine tires.

We claim:

1. A steering system for steering a machine on a terrain, the machine having a front and a rear, and opposing first and second sides, the steering system comprising:
   a first pair of rotatably mounted rear wheels disposed along the first side of the machine, each of the rear wheels of the first pair of rear wheels including a wheel axis,
   a second pair of rotatably mounted rear wheels disposed along the second side of the machine, each of the rear wheels of the second pair of rear wheels including a wheel axis
   a first tandem support, the first pair of rear wheels being rotatably mounted to the first tandem support, the first tandem support being pivotably mounted along the first side of the machine,
   a second tandem support, the second pair of rear wheels being rotatably mounted to the second tandem support, the second tandem support being pivotably mounted along the second side of the machine,
   at least one rotatably mounted front wheel, said front wheel being spaced from said first and second pairs of rear wheels,
   a plurality of drive units including at least one first drive unit for rotating the rear wheels of the first pair along a first drive unit axis, and at least one second drive unit for rotating the rear wheels of the second pair along a second drive unit axis, the first drive unit axis not being coincident with at least one of the wheel axes of the wheels of the first pair, the second drive unit axis not being coincident with at least one of the wheel axes of the wheels of the second pair,
   a steering input device for producing a steering input signal,
   a first rotation transmission arrangement disposed between the first drive unit and at least one of the wheels of the first pair,
   a second rotation transmission arrangement disposed between the second drive unit axis and at least one of the wheels of the second pair, and
   a controller for receiving the steering input signal and producing drive unit request signals to control the first and second drive units to rotate the associated rear wheels, the request signals causing the first drive unit to rotate the first pair of rear wheels disposed along the first side of the machine at rotational speeds greater than rotational speeds at which the second drive unit rotates the second pair of wheels disposed along the second side of the machine.

2. The steering system of claim 1 wherein the plurality of drive units includes at least two first drive units for independently rotating the respective rear wheels of the first pair, and at least two second drive units for independently rotating the respective rear wheels of the second pair.

3. The steering system of claim 1 wherein the plurality of drive units includes at least two first drive units for independently rotating the respective rear wheels of the first pair, and at least two second drive units for independently rotating the respective rear wheels of the second pair.

4. The steering system of claim 1 wherein the machine includes front and rear frame sections, the frame sections being articulable relative to one another, the front wheel being rotatably coupled to the front frame section and the rear wheels being rotatably coupled to the rear frame section.

5. The steering system of claim 1 for the machine traversing a hill, the first side of the machine being disposed generally downhill and the second side being disposed generally uphill, and wherein the controller is adapted to produce request signals causing the first pair of rear wheels disposed along the first side of the machine to rotate at respective rotational speeds greater than the second pair of rear wheels disposed along the second side of the machine disposed uphill to cause the machine to move in at least one of a substantially straight line or to turn uphill.

6. The steering system of claim 1 further comprising at least a first and a second hydraulic pump and wherein the drive units are hydraulic motors, the first and second hydraulic pumps being fluidly coupled to the first and second hydraulic motors, respectively.

7. The steering system of claim 6 further including at least one sensor adapted to provide information to the controller relative to at least one of a first pump displacement, a second pump displacement, a first motor speed, a second motor speed, a speed of at least one of the wheels of the first pair, a speed of at least one of the wheels of the second pair, a speed of the front wheel, a lean angle of at least one of the wheels.

8. The steering system of claim wherein the machine includes front and rear frame sections, the frame sections being articulable relative to one another, the front wheel being rotatably coupled to the front frame section and the rear wheels being rotatably coupled to the rear frame section.

9. A machine for use on a terrain, the machine comprising
a mainframe,
a first side,
a second side, said first and second sides being opposed,
a first pair of rear wheels rotatably coupled to the mainframe along the first side, each of the rear wheels of the first pair of rear wheels including a wheel axis,
a second pair of rear wheels rotatably coupled to the mainframe along the second side, each of the rear wheels of the second pair of rear wheels including a wheel axis,
at least one front wheel rotatably coupled to the mainframe, the front wheel being spaced from the first and second pairs of rear wheels,
a plurality of drive units including at least a first drive unit disposed to rotate the rear wheels of the first pair along a first drive unit axis, and at least a second drive unit disposed to rotate the rear wheels of the second pair along a second drive unit axis, the first drive unit axis not being coincident with at least one of the wheel axes of the wheels of the first pair, the second drive unit axis not being coincident with at least one of the wheel axes of the wheels of the second pair,
a steering input device for producing a steering input signal,
a first rotation transmission arrangement disposed between the first drive unit and at least one of the wheels of the first pair,
a second rotation transmission arrangement disposed between the second drive unit axis and at least one of the wheels of the second pair, and
a controller for receiving the steering input signal and producing drive unit request signals to control the first and second drive units to rotate the associated rear wheels, the request signals causing the first pair of rear wheels disposed along first side of the machine to rotate at rotational speeds greater than the rotational speeds of the second pair of rear wheels disposed along the second side of the machine.

10. The machine of claim 9 further comprising first and second tandem supports, the first pair of rear wheels being rotatably mounted to the first tandem support, the second pair of rear wheels being rotatably mounted to the second tandem support, the first tandem support being pivotably mounted along the first side of the machine, and the second tandem support being pivotably mounted along the second side of the machine.

11. The machine of claim 10 wherein the plurality of drive units includes at least two first drive units for independently rotating the respective rear wheels of the first pair, and at least two second drive units for independently rotating the respective rear wheels of the second pair.

12. The machine of claim 9 wherein the plurality of drive units includes at least two first drive units for independently rotating the respective rear wheels of the first pair, and at least two second drive units for independently rotating the respective rear wheels of the second pair.

13. The machine of claim 9 wherein the machine includes front and rear frame sections, the frame sections being articulable relative to one another, the front wheel being rotatably coupled to the front frame section and the rear wheels being rotatably coupled to the rear frame section.

14. The machine of claim 9 further comprising at least a first and a second hydraulic pump and wherein the drive units are hydraulic motors, the first and second hydraulic pumps being fluidly coupled to the first and second hydraulic motors, respectively.

15. The machine of claim 14 further including at least one sensor adapted to provide information to the controller relative to at least one of a first pump displacement, a second pump displacement, a first motor speed, a second motor speed, a speed of at least one of the wheels of the first pair, a speed of at least one of the wheels of the second pair, a speed of the front wheel, a lean angle of at least one of the wheels, wherein the front wheel is adapted to be steered and the controller is adapted produce a request signal to steer the front wheel toward a turn direction in response to the steering input signal from the steering input device, the turn direction being toward the second side of the machine, the controller further being adapted to produce drive unit request signals to cause the first pair of rear wheels disposed along the first side of the machine to rotate at respective rotational speeds greater than the rotational speed of the second pair of rear wheels disposed along the second side of the machine.

* * * * *